3,164,863
APPARATUS FOR EXTRUDING PLASTIC MATERIAL
James Robert Hunt, 118 N. Alabama, Butte, Mont.
Filed Feb. 26, 1964, Ser. No. 347,515
10 Claims. (Cl. 18—12)

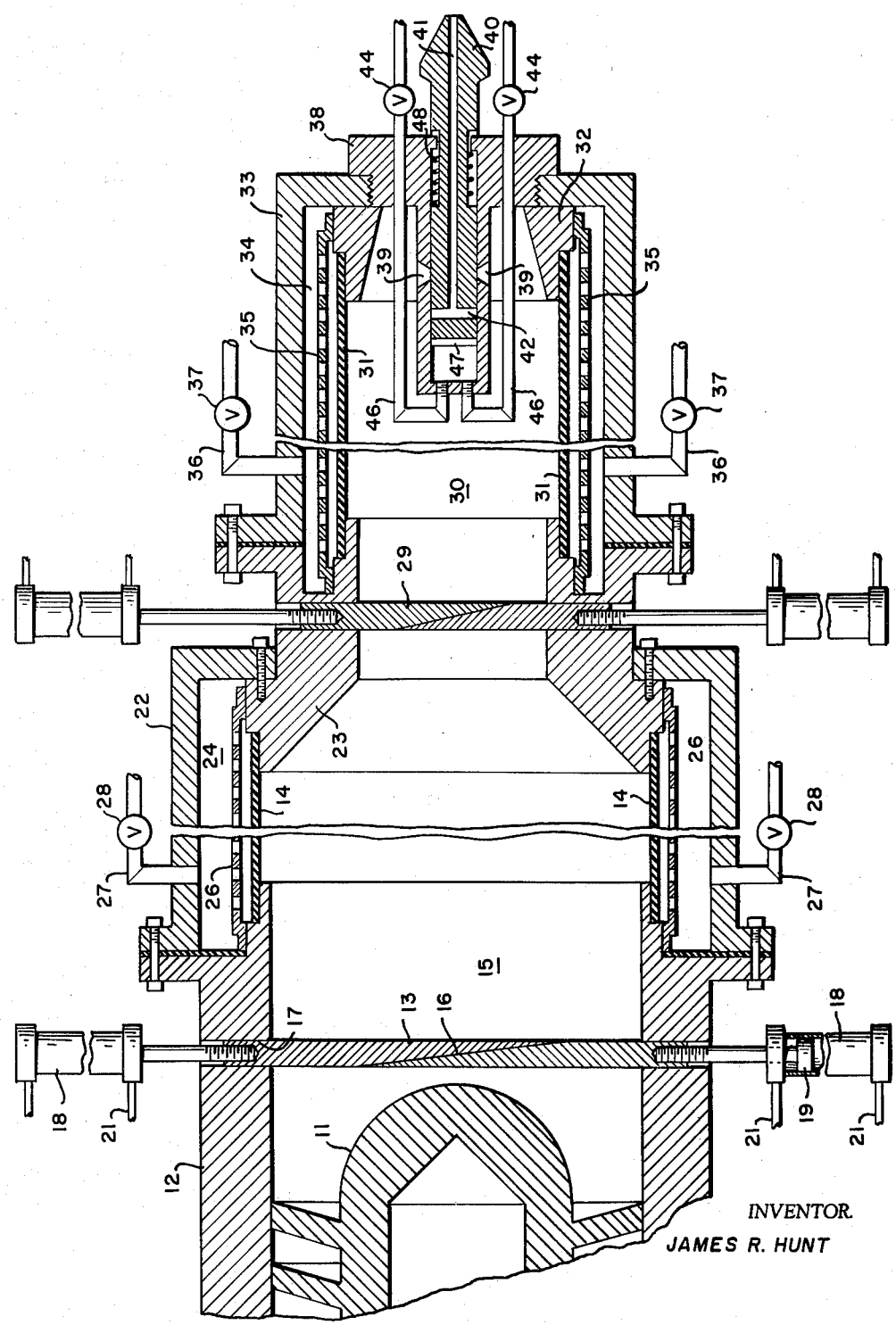
INVENTOR.
JAMES R. HUNT

This invention relates to a method of and apparatus for extruding thermoplastic materials and more particularly to methods of and apparatus for extruding metered shots of thermoplastic material by squeezing a flexible operating chamber. This application is a continuation-in-part of the inventor's copending patent application Serial No. 99,636, filed March 30, 1961, and now abandoned, and entitled "Machine for Molding, Forming, and/or Extrusion of Themoplastic Material."

An object of this invention is to provide an apparatus for rapidly extruding metered charges or shots of thermoplastic material.

Still another object of this invention is to provide an apparatus for extruding thermoplastic material by squeezing a flexible reservoir and operating chambers by means of fluid pressure.

Still another object of this invention is to provide a squeeze-type thermoplastic extruding machine including a retractible extrusion nozzle.

These and many other objects may be obtained in accordance with this invention which in general may include a flexible reservoir bladder for receiving and temporarily storing preheated thermoplastic materials. The flexible reservoir bladder includes heating elements for maintaining the thermoplastic material at the desired working temperature. A fluid pressure chamber surrounds the flexible reservoir bladder which is squeezed when the pressure is increased in the surrounding pressure chamber to extrude the thermoplastic material through suitable gates into a flexible operating bladder adjacent thereto. The flexible operating bladder is similarly surrounded by a high pressure chamber and when rapidly squeezed extrudes metered shots of the thermoplastic material through a retractible nozzle, the size of the metered shots of thermoplastic material being determined by the pressure exerted on the operating bladder and the displacement thereof.

These and many other objects and advantages of this invention will become apparent from the following detailed description of a preferred embodiment of the invention when read in view of the appended drawing which is a cross-sectional view of an extrusion machine in accordance with the principle of the invention.

Referring now to the drawing, a feed screw or worm 11 driven by conventional means and mounted in a cylindrical worm drive casing 12 is arranged to feed preheated thermoplastic granules from a suitable hopper through hydraulically operated shut-off gates 13 into a flexible reservoir bladder 14 forming a reservoir chamber 15. The shut-off gates 13 are provided with cooperating tapered edges 16 and are reciprocated within slideways 17 formed in the worm casing 12 by means of a double acting air cylinder 18 that includes a reciprocating piston 19 attached to the respective gates 13. Pressure is applied to the double acting cylinder 18 by way of inlets 21.

The flexible reservoir bladder may be formed of a heat-resistant silicone rubber and may be reinforced with fiber-glass or other suitable material so as to withstand the temperature of the thermoplastic material within the reservoir chamber. The wall thickness, length and diameter of the reservoir bladder 14 may be varied as desired and as required to meet the specific operation of the extrusion machine with reference to the amount of thermoplastic material to be displaced from the bladder on each squeeze or displacement of the bladder. An outer cylindrical jacket 22 bolted to the casing 12 and an endplate 23 forms a pressure chamber 24 that surrounds the flexible reservoir bladder 14. A perforated and rigid support tube 26 also surrounds the flexible reservoir bladder 14 and is arranged to uniformly distribute the fluid pressure within the pressure chamber 24 over the entire exterior surface of the flexible reservoir bladder. Fluid is admitted into the chamber 24 by way of inlet passages 27 and suitable valves 28 which may be electrically or manually operated so as to create pulses of pressure in the chamber 24 and effect periodic and substantially instantaneous squeezing of the flexible reservoir bladder 14.

Hydraulic shut-off gates 29 identical with the shut-off gates 13 and operated by double-acting air cylinders in the same manner, separate the reservoir chamber 15 from an adjacent operating chamber 30 formed by a cylindrical and flexible operating bladder 31 attached to the endplate 23 and a head 32. A cylindrical jacket 33 surrounds the flexible operating bladder 31 forming a pressure chamber 34 that extends completely around the operating bladder 31. The flexible operating bladder 31 is encased in a rigid perforated support tube 35 that equally and uniformly distributes the pressure within the chamber 34 around the exterior surface of the flexible operating bladder 31. Fluid, under pressure, is admitted into the chamber 34 by way of inlets 36 and suitable valves 37.

A removable cylindrical nozzle case 38 threadably secured to the head 32 and having openings 39 extends into the operating chamber 30. A solid, reciprocal valve core 40 positioned within the nozzle casing 38 is provided with an axial discharge passage 41 that extends partially therethrough and spaced diametrically opposing radial passages 42 that open into the discharge passage 41. Fluid under pressure is admitted into the nozzle casing 38 by way of control valves 44 and conduits 46. A sealing gasket 47 in the nozzle casing 38 is provided to prevent fluid pressure by-pass and pressure loss. A compression spring 48 surrounding the valve core 41 is provided for normally holding the valve core 40 in a closed retracted position.

*Description of Operation*

The hydraulically operated shut-off gate 13 is opened and gate 29 closed, and the worm feed 11 turned on to fill the reservoir bladder 14 and reservoir chamber 15 with preheated thermoplastic material. Upon filling the reservoir chamber 15, the worm feed 11 is stopped, gates 13 closed, gates 29 opened and fluid under pressure admitted into the pressure chamber 24 to squeeze the reservoir bladder 14 and force the thermoplastic material into the operating chamber 29. The perforated support tube surrounding the flexible reservoir bladder 14 uniformly distributes the pressure within the chamber 24 around the flexible reservoir bladder 14. When the control valves 27 are pulsed the flexible bladder 14 is instantaneously squeezed by a constant, uniformly distributed, pressure to displace a metered quantity of thermoplastic material from the reservoir bladder 14 into the adjacent operating bladder 31. When a sufficient amount of thermoplastic material has been squeezed into the operating chamber 30 the gate 29 is closed and the fluid pressure in the chamber 24 removed. At this time the machine is prepared for molding or extrusion and the reservoir chamber 15 may again be filled as described.

With no pressure in the chamber 34 and the nozzle valve core 40 in the closed or retracted position the nozzle may be positioned in the desired mold. To extrude metered amounts of thermoplastic material or inject it into suitable molds fluid under determined pressure is admitted into the chamber 34 to squeeze the bladder 31 while fluid under pressure is introduced into the nozzle casing 38 to extend the valve core 40 aligning the holes 39 and the radial passages 42. At this time the nozzle is open and a metered amount or shot of thermoplastic material, as determined by the displacement of the operating bladder 31, is extruded through the discharge passage 42. As the displacement of the operating bladder 31 is determined by the squeeze pressure in the pressure chamber 33, the size of shot may be readily and precisely controlled by regulating the fluid pressure.

By maintaining the nozzle in the open position and periodically squeezing the flexible operating bladder 31, metered shots of plastic material are rapidly extruded through the nozzle and injected into suitable molds. Each time the pressure is removed within the nozzle casing 38, the spring 48 returns the valve core 40 to the closed position. In this manner the nozzle can be kept open at all times or periodically closed upon the relaxation of each squeeze operation. The latter operation can be achieved by operating the control valves 37 and 44 at substantially the same time.

If the size of each shot to be extruded is relatively large compared to the volume of the operating chamber 30, the operating chamber can be filled after each shot simply by removing the pressure from the chamber 34, opening the shut-off gates 29 and pulsing the chamber 24 to squeeze the reservoir bladder 14 and fill the operating chamber 30. During rapid operation of the extruding machine and while the flexible operating bladder 31 is repeatedly squeezed with the nozzle open, the fluid pressure in the pressure chamber 33 may be increased a determined amount after each successive shot to assure a controlled displacement of the operating blader and thus a succession of metered shots of thermoplastic material.

Although a preferred embodiment of the invention has been described in detail numerous changes and modifications can be made within the princples and teachings of the invention which is to be limited only by the scope of the appended claims.

What is claimed is:

1. In a machine for extruding metered shots of thermoplastic material, a flexible reservoir bladder for receiving and temporarily storing thermoplastic materials and for maintaining said thermoplastic material at a desired temperature; a fluid pressure chamber around said flexible reservoir bladder for squeezing said reservoir bladder; a flexible operating bladder adjacent said flexible reservoir bladder; a normally closed shut-off gate separating said reservoir and operating bladders and for passing said thermoplastic materials from said reservoir bladder into said operating bladder when said gate is opened and said reservoir bladder is squeezed; a fluid pressure chamber surrounding said flexible operating bladder for squeezing said flexible operating bladder; a normally closed reciprocal nozzle positioned in and extending from said flexible operating bladder; and a source of fluid pressure connected to said normally closed reciprocable nozzle for opening said nozzle whereby metered shots of said thermoplastic material are extruded through said nozzle when said flexible operating bladder is periodically squeezed by increasing the fluid pressure in said fluid pressure chamber, the size of said shots being determined by the displacement of said flexible operating bladder upon each squeeze.

2. Apparatus as defined in claim 1 including mechanical means for closing said nozzle when fluid pressure is removed therefrom.

3. Apparatus as defined in claim 1 wherein said nozzle comprises an apertured casing and a reciprocable section mounted therein, said section having a longitudinal discharge passage therein and radial passages opening into said longitudinal passage; a source of fluid pressure connected to said casing for displacing said section within said casing to align said apertures in said casing with said radial passages whereby said nozzle is opened; and mechanical means for returning said section to said closed position upon removal of fluid pressure from within said casing.

4. Apparatus as defined in claim 1 including a worm feed for filling said flexible reservoir bladder with preheated thermoplastic granules and a shut-off gate for separating said worm feed and said flexible reservoir bladder.

5. Apparatus for extruding plastic material comprising: a reservoir bladder having an inlet and an outlet for receiving plastic material; an operating bladder positioned adjacent said reservoir bladder, said reservoir bladder outlet opening into said operating bladder; a normally closed nozzle secured to said operating bladder; means for feeding plastic material into said reservoir bladder; hydraulic means for alternately squeezing said reservoir bladder and said operating bladder; and means for simultaneously opening said outlet and closing said inlet during the intervals when said reservoir bladder is squeezed and for closing said outlet and opening said inlet and said nozzle during intervals when said operating bladder is squeezed whereby metered shots of plastic material are extruded through said nozzle.

6. Plastic extrusion material comprising: a reservoir having a flexible sidewall, said reservoir having an inlet and an outlet; an operating chamber having a flexible sidewall positioned adjacent said reservoir, said reservoir outlet opening into said operating chamber; a normally closed nozzle secured to said operating chamber; means for alternately opening and closing said inlet and outlet; means for feeding plastic material into said reservoir; and means for alternately squeezing said reservoir when said outlet is open and said inlet closed and said operating chamber when said outlet is closed while simultaneously opening said nozzle when said outlet is closed whereby metered shots of plastic material are extruded through said nozzle.

7. Apparatus as defined in claim 6 wherein said reservoir includes a heating element for heating the plastic material in said reservoir.

8. An apparatus for extruding plastic material comprising: an operating bladder having a flexible sidewall, said operating bladder having an inlet and an outlet; a gate for said outlet; means for periodically opening and closing said gate; means for feeding plastic material into said operating bladder during intervals when said gate is open; an extrusion nozzle received in said outlet, said nozzle including a cylindrical casing having radially spaced holes therein and extending into said operating bladder; a movable cylindrical nozzle core mounted in and extending from said casing, said core having a longitudinal passage extending partially therethrough and radially spaced holes in said core opening into said passage; means for reciprocating said core within said casing between a closed position and an open position whereat said holes in said core and said casing coincide, said core being positioned in the closed position when said gate is open and in the open position when said gate is closed; and means for squeezing said operating bladder when said gate is closed whereby metered shots of plastic material are extruded through said nozzle.

9. Apparatus as defined in claim 8 wherein said means for reciprocating said nozzle core includes hydraulic means for forcing the core outwardly in said casing to said open position and mechanical means for returning said nozzle core to said closed position.

10. Apparatus for extruding metered shots of plastic material comprising: a cylindrical bladder having a flexible sidewall, said bladder having an inlet and an outlet; gates for said inlet and outlet; means for alternately opening and closing said gates; means for feeding plastic material into said bladder during intervals when said inlet gate is open; a fluid pressure chamber surrounding said bladder; and means for periodically increasing the pressure in said fluid pressure chamber and squeezing said bladder during intervals when said outlet gate is open whereby metered shots of plastic material are extruded through said outlet, said feed means comprising a reservoir bladder for receiving plastic material opening into said inlet and a fluid pressure chamber surrounding said reservoir bladder; and means for periodically increasing the pressure in said fluid pressure chamber to squeeze said reservoir bladder and force plastic material into said operating bladder each time said inlet gate is opened.

References Cited in the file of this patent
UNITED STATES PATENTS

| | | |
|---|---|---|
| 2,425,237 | Field | Aug. 5, 1947 |
| 2,768,405 | Mineah | Oct. 30, 1956 |
| 2,778,534 | Ramsey | June 22, 1957 |
| 2,892,214 | McCarthy | June 30, 1959 |
| 3,008,193 | Been | Nov. 14, 1961 |